(12) United States Patent
An

(10) Patent No.: US 7,497,485 B2
(45) Date of Patent: Mar. 3, 2009

(54) BAND DEVICE OF JOINING PIPE FOR PREVENTING FROM LEAKAGE

(76) Inventor: Byung-moo An, #60 Eumnae 1-ri, Uljin-eup, Uljin-gun, Gyeongsangbuk-do, Seoul (KR) 767-801

( * ) Notice: Subject to any disclaimer, the term of this patent is extended or adjusted under 35 U.S.C. 154(b) by 0 days.

(21) Appl. No.: 10/595,366

(22) PCT Filed: Oct. 18, 2004

(86) PCT No.: PCT/KR2004/002666

§ 371 (c)(1),
(2), (4) Date: Apr. 12, 2006

(87) PCT Pub. No.: WO2005/038152

PCT Pub. Date: Apr. 28, 2005

(65) Prior Publication Data

US 2007/0052238 A1     Mar. 8, 2007

(30) Foreign Application Priority Data

Oct. 17, 2003  (KR) ............. 20-2003-0032512 U
Nov. 7, 2003   (KR) ............. 20-2003-0034980 U

(51) Int. Cl.
    *F16L 21/00*   (2006.01)
(52) U.S. Cl. ............... 285/419; 285/367; 285/373; 285/420; 24/19
(58) Field of Classification Search ............. 285/420, 285/419, 373, 367, 368; 24/19, 20 R
    See application file for complete search history.

(56) References Cited

U.S. PATENT DOCUMENTS

| | | | | |
|---|---|---|---|---|
| 2,341,828 A | * | 2/1944 | Tetzlaff | 24/279 |
| 3,151,632 A | * | 10/1964 | Risley et al. | 138/99 |
| 3,439,945 A | * | 4/1969 | Chambers et al. | 285/373 |
| 3,487,856 A | * | 1/1970 | Graham et al. | 138/99 |
| 3,680,180 A | * | 8/1972 | Gould et al. | 24/279 |
| 3,848,638 A | * | 11/1974 | Huslander et al. | 138/99 |
| 4,364,588 A | * | 12/1982 | Thompson | 285/419 |
| 4,583,770 A | * | 4/1986 | Kreku et al. | 285/148.26 |
| 4,705,078 A | * | 11/1987 | Montgomery | 138/99 |
| 4,813,720 A | * | 3/1989 | Cassel | 285/419 |
| 4,889,167 A | * | 12/1989 | Morris | 138/99 |
| 5,010,626 A | * | 4/1991 | Dominguez | 24/279 |
| 5,286,064 A | * | 2/1994 | Bridges | 285/15 |
| 5,769,467 A | * | 6/1998 | Bridges | 285/370 |
| 6,116,659 A | * | 9/2000 | Wagner | 285/373 |

(Continued)

*Primary Examiner*—James M Hewitt
*Assistant Examiner*—Jay R Ripley
(74) *Attorney, Agent, or Firm*—Summa, Additon & Ashe, P.A.

(57) ABSTRACT

The present invention provides a pipe joint which provides a seal after joining pipes, thus preventing water from leaking. The pipe joint includes a body part (10) and a coupling part (20). The pipe joint further includes a locking means (30) to couple both ends of the body part (10) to each other, and a reinforcing unit (40) which is reduced in thickness at both ends thereof. The pipe joint further includes sealing units (11) and (41) which are provided inside the body part (10) and the reinforcing unit (40). In the pipe joint of the present invention, the body part and the coupling parts comprise an integrated plate. As such, the pipe joint of the present invention greatly affects both producers and consumers due to its economic efficiency.

5 Claims, 8 Drawing Sheets

U.S. PATENT DOCUMENTS 6,519,815 B2 * 2/2003 Cassel et al. ............... 24/279
7,052,052 B2 * 5/2006 Protas et al. ............... 285/420
2003/0052236 A1 * 3/2003 Vogel et al. ............... 248/74.1

* cited by examiner

PRIOR ART

PRIOR ART

BAND DEVICE OF JOINING PIPE FOR PREVENTING FROM LEAKAGE

TECHNICAL FIELD

The present invention relates, in general, to pipe joints to couple pipes to each other and, more particularly, to a pipe joint which joins pipes, such as branch pipes and drain pipes provided in a lower portion of a manhole, and provides a superior seal after joining the pipes, thus preventing water from leaking at a junction of the joined pipes, and which can easily join pipes even though the pipes are different diameters.

BACKGROUND ART

Generally, manholes to drain rainwater and sewage have pipe joining structures in which pipes 1, such as branch pipes, provided in a lower portion of the manhole, and drain pipes coupled to the branch pipes, are coupled to each other. Typically, pipe joints are used at junctions between the pipes 1, such as the branch pipes and the drain pipes of the manholes, to prevent water from leaking. The above-mentioned pipe joints can be adapted to join pipes 1 of various diameters.

A representative example of conventional pipe joints will be described herein below with reference to FIG. 1 showing its general construction. A conventional pipe joint includes a main body 2 which has at an inner surface thereof a cushion unit 5 made of rubber. The pipe joint further includes coupling parts 3 which have bent shapes and are coupled at both ends of the main body 2 by welding. The pipe joint further includes an extension part 4 which is provided on one end of the main body 2 while extending from the coupling part 3.

As shown in FIG. 2, the conventional pipe joint having the above-mentioned construction is mounted around a junction of pipes 1. In detail, the coupling parts 3 are coupled to each other by locking bolts 6 and locking nuts 7. The extension part 4 of the main body 2 is inserted between an end of the cushion unit 5 and the opposite end of the main body 2, thus being in close contact together into a stacked shape. By the above-mentioned coupling method, even though the pipes 1 have various diameters, the pipe joint can join the pipes 1 within a range capable of overlapping the extension part 4 and the opposite end of the main body 2.

However, in the case that two pipes 1, in which one pipe 1 is inserted into the other pipe 1, are joined using the conventional pipe joint, a gap undesirably occurs between an inner surface of the main body 2 of the pipe joint and an outer surface of the small pipe 1. In other words, because the main body 2 of the conventional pipe joint has a cylindrical shape having a constant diameter, although the cushion unit 5 provided inside the main body 2 has superior elasticity, it is very difficult to firmly seal the junction between the two pipes 1 coupled to each other to be stepped.

Furthermore, if the extension part 4 of the main body 2 is inserted too far between the opposite end of the main body 2 and the end of the cushion unit 5, a part of the cushion unit 5 may detach from the inner surface of the main body 2. Thus, the detached part of the cushion unit 5 may undesirably fold two or three times. In this case, gaps are caused in the detached part of the cushion unit 5. Water leakage may occur at such gaps.

In addition, because an area of a part of each coupling part 3, welded with the main body 2, is narrow, when the coupling parts 3 are coupled to each other by the locking bolts 6 and the locking nuts 7, the welded parts of the coupling parts 3 may break. Alternatively, the coupling parts 3 do not withstand the resistance of the main body 2 and, thereby, a gap between them may get wider.

[Disclosure]

[Technical Problem]

Accordingly, the present invention has been made keeping in mind the above problems occurring in the prior art, and an object of the present invention is to provide a pipe joint which can be easily adapted to join pipes of various diameters, and in which even though a junction between the pipes is stepped, the junction is efficiently sealed, thus ensuring water tightness at the junction of the pipes.

Another object of the present invention is to provide a pipe joint in which a body part and coupling parts are configured as an integrated plate or the coupling parts are integrally coupled to the body part, thus providing superior durability, and increasing the productivity due to an improvement in a manufacturing process.

BEST MODE

Figure 1:
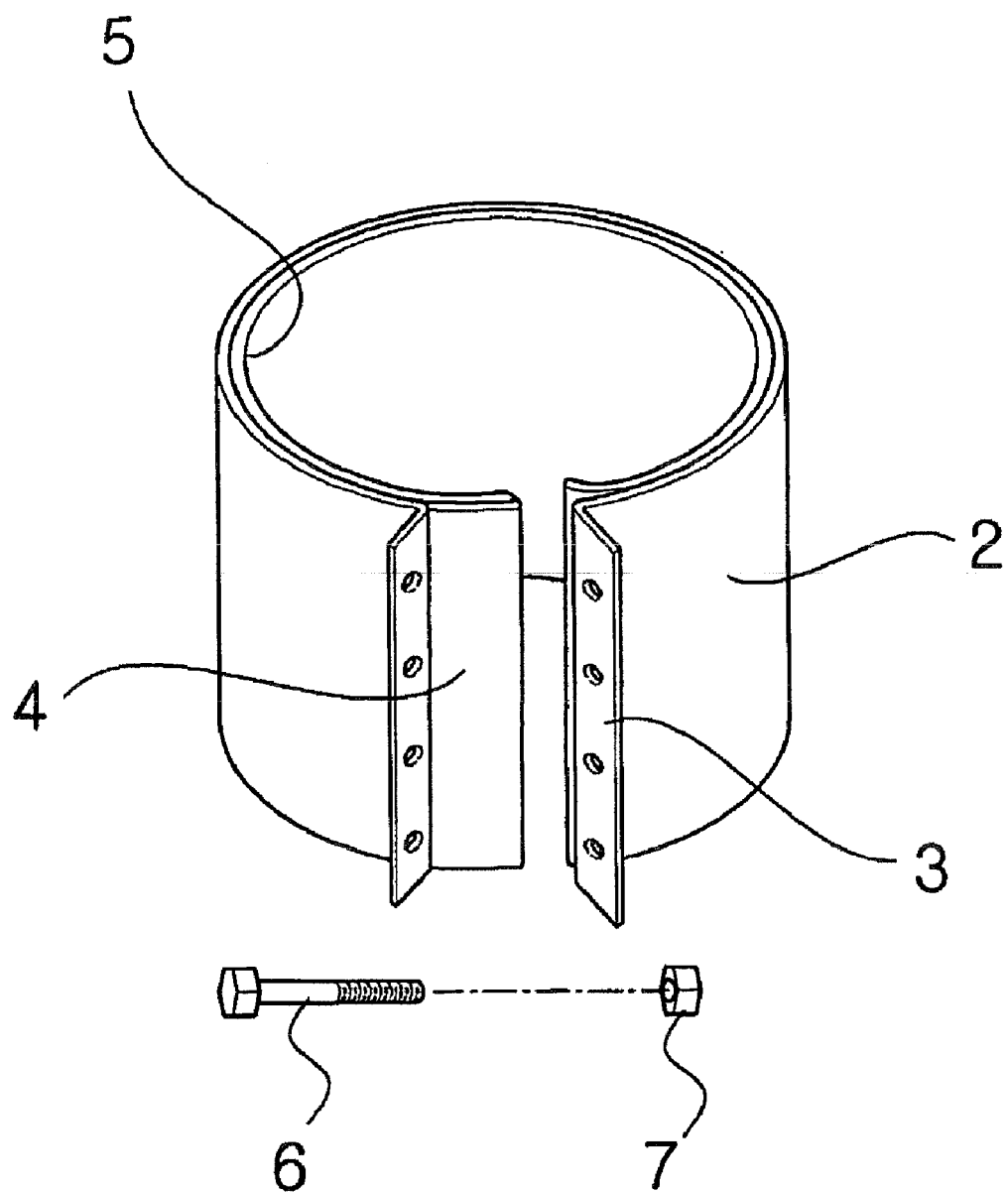
FIG. 1 is an exploded perspective view of a conventional pipe joint.
Figure 2:
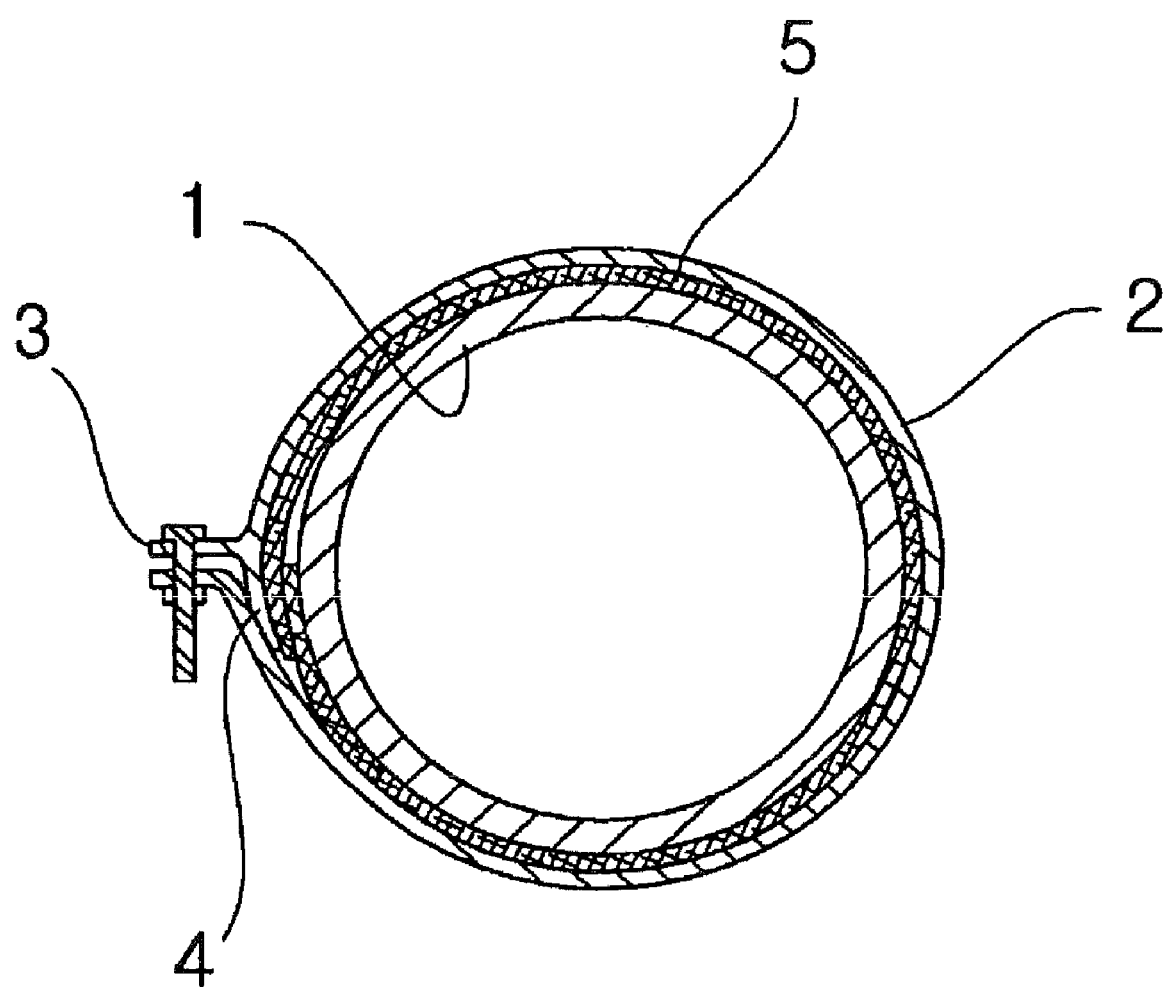
FIG. 2 is a sectional view to show the operation of the conventional pipe joint.
Figure 3:
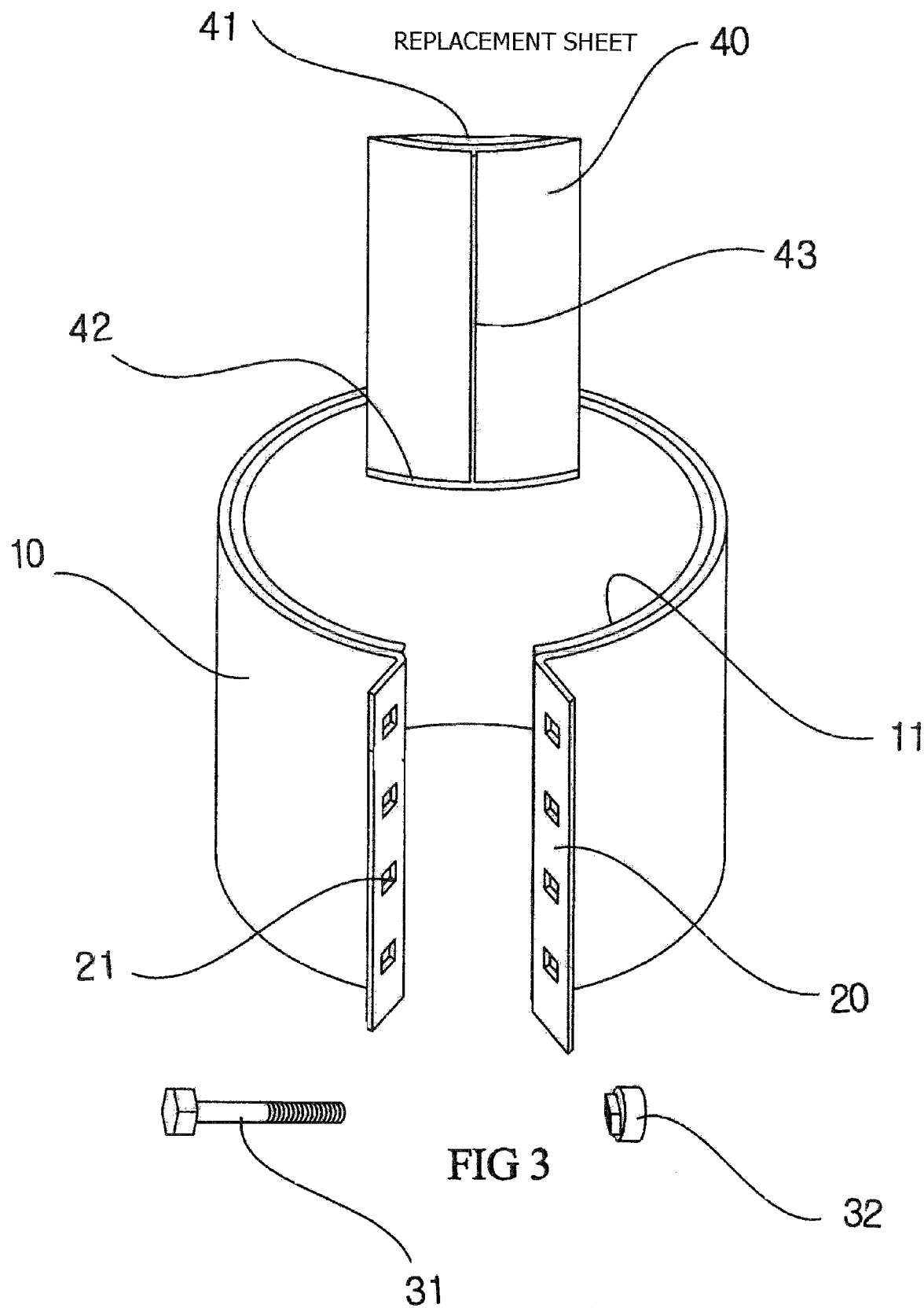
FIG. 3 is an exploded perspective view of a pipe joint, according to a first embodiment of the present invention.

In order to accomplish the above object, a pipe joint of the present invention is characterized in that both ends of a body part, to which coupling parts having bent shapes are integrally provided, are coupled by a locking means, and a reinforcing unit, which is gradually reduced in thickness from a center to both ends thereof, is provided.

In particular, the body part has a cylindrical shape. The body part may have constant inner and outer diameters at upper and lower parts thereof. Alternatively, the body part may be stepped around a predetermined portion thereof so that upper and lower parts differ in inner and outer diameters. Thus, the pipe joint can be adapted to join pipes of various diameters and, as well, it can easily join pipes having different diameters.

Furthermore, in the pipe joint of the present invention, a sealing unit is provided inside each of the body part and the reinforcing unit to prevent water leakage from occurring at a junction between pipes. As well, the sealing unit includes a close contact means to increase a contact force at a contact surface being in close contact with the body part.

Hereinafter, the construction of the pipe joint of the present invention will be described in detail, with reference to the accompanying drawings.

As shown in FIGS. 3 through 7, the pipe joint of the present invention can be embodied in various shapes according to a shape of a body part 10, 10*a* of which upper and lower parts are constant or different in inner and outer diameters.

The pipe joint according to each of the embodiments of the present invention includes the body part 10, 10*a* which is provided by rolling a planar material into a predetermined curvature. The pipe joint further includes coupling parts 20, 20*a* which are integrated with the body part 10, 10*a*. A plurality of locking holes 21, 21*a* is provided on the coupling part 20, 20*a*. The pipe joint further includes a locking means 30, 30*a* to couple the coupling parts 20, 20*a* to each other, and a reinforcing unit 40, 40*a* which is in close contact with an inner surface of the body part 10, 10*a* while joining pipes 1.

The body part 10, 10*a* is made of an elastic metal or a synthetic resin having high hardness. Due to the above-mentioned special shape of the body part 10, 10*a* in which a planar material having a predetermined width is rolled, pipes 1 of various diameters can be joined.

Figure 5:
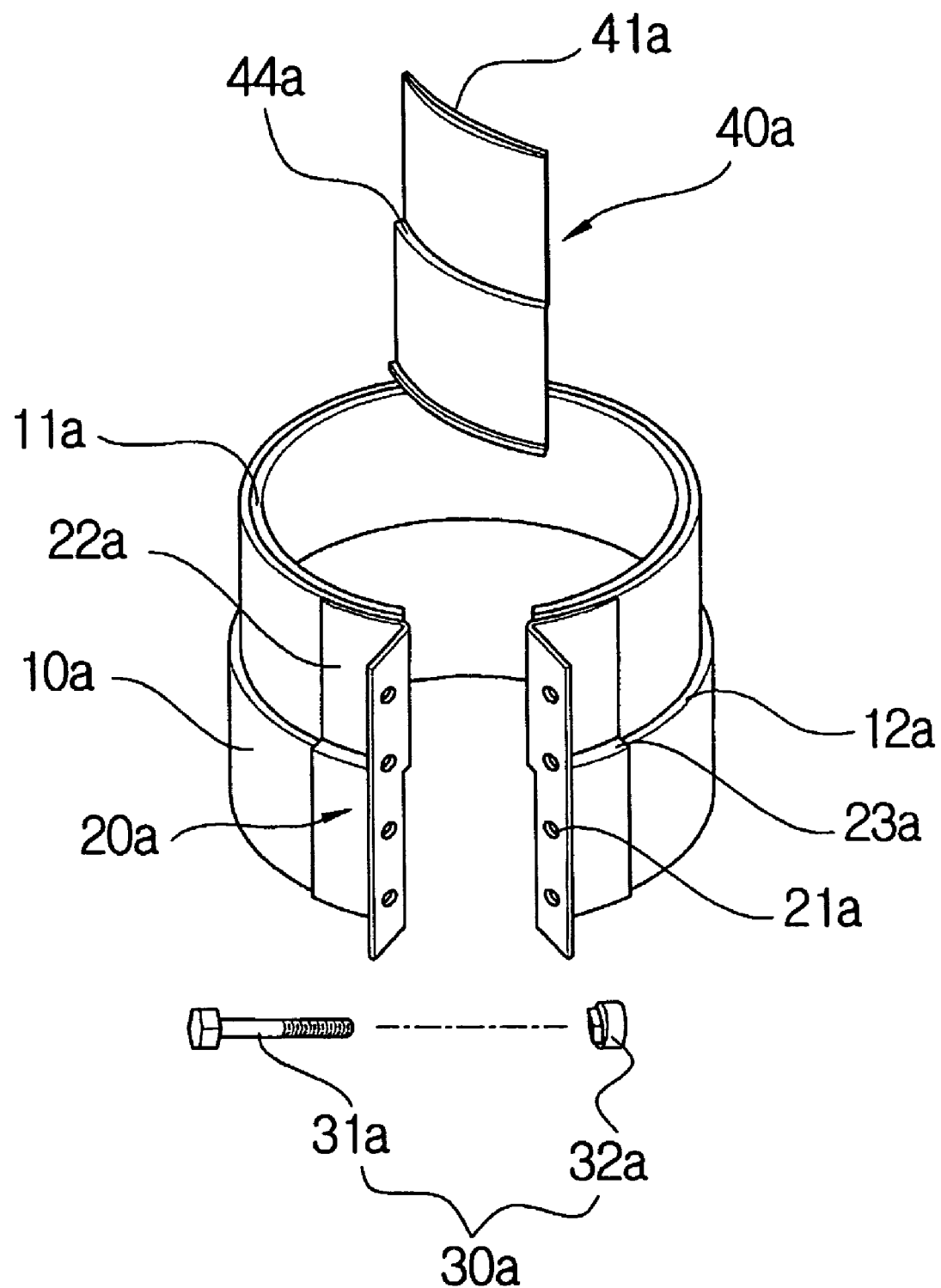
FIG. 5 is an exploded perspective view of a pipe joint, according to a second embodiment of the present invention.
Figure 6:
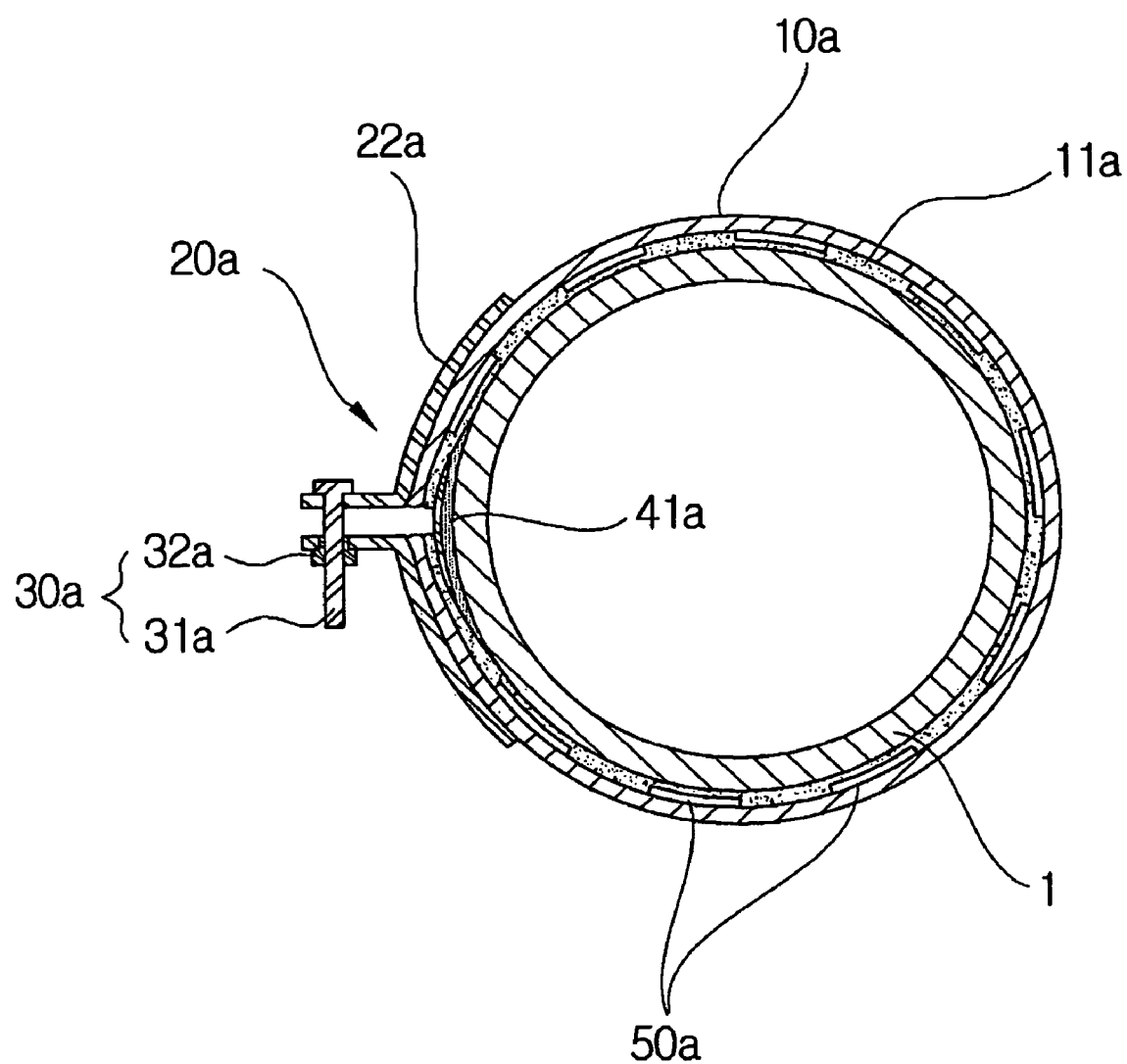
FIG. 6 is a latitudinal sectional view to show the operation of the pipe joint according to the second embodiment of the present invention.
Figure 7:
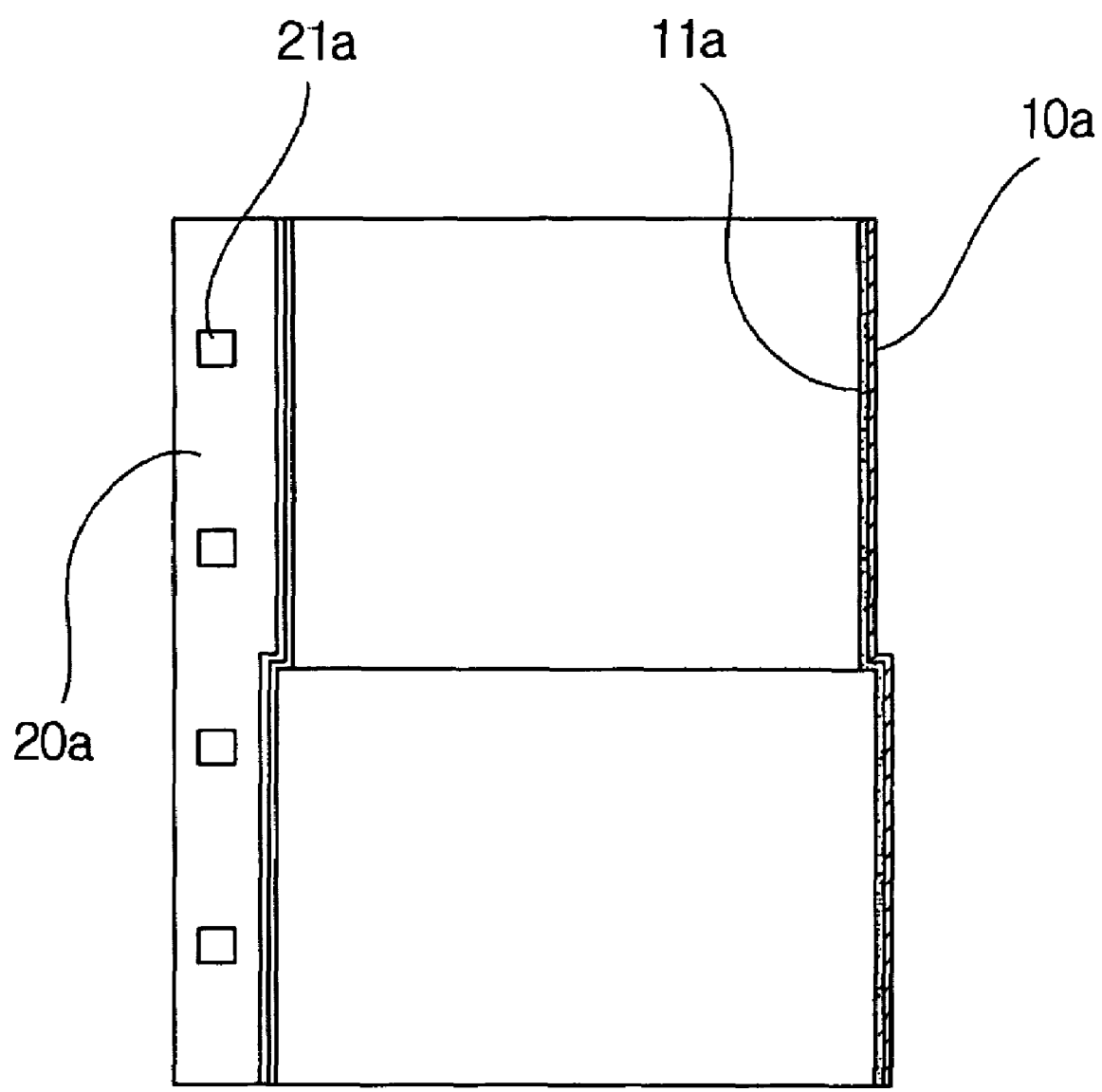
FIG. 7 is a longitudinal sectional view to show the operation of the pipe joint according to the second embodiment of the present invention.
Figure 8:
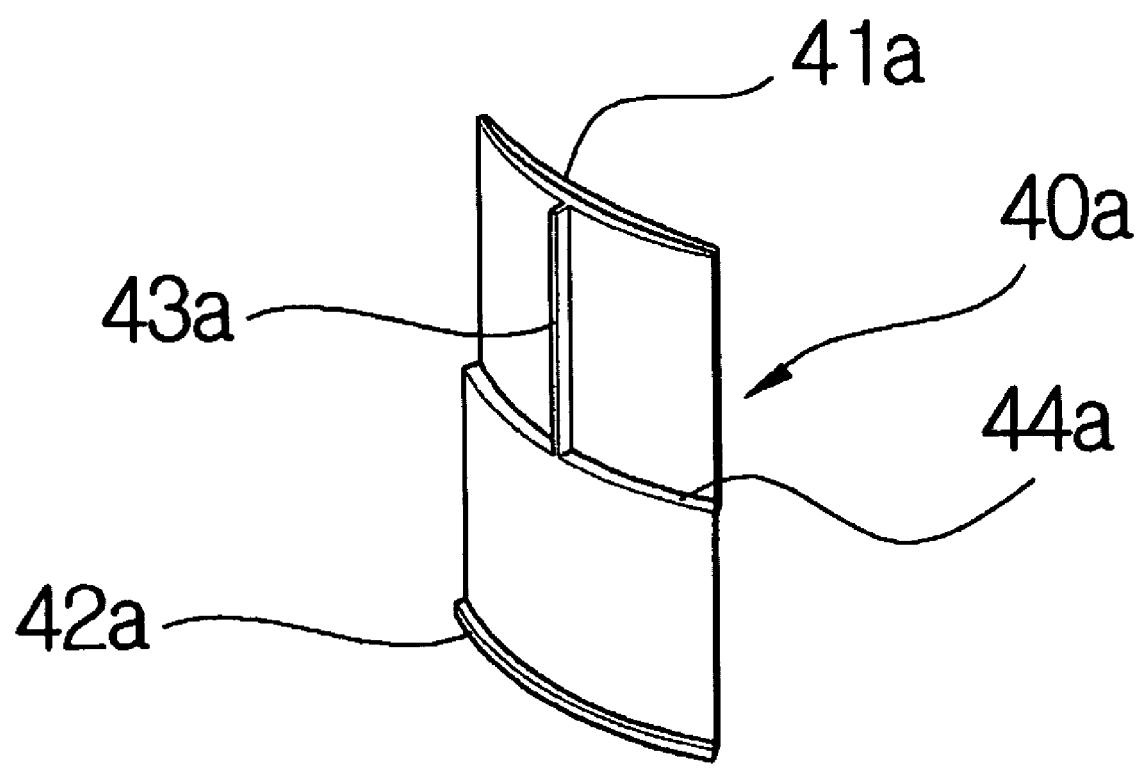
FIG. 8 is a perspective view showing a reinforcing unit of the pipe joint according to the second embodiment of the present invention.

As shown in FIGS. 5 through 7, in the case of the body part 10*a* of the present invention having upper and lower parts differing in inner and outer diameters, a stepped part 12*a* protrudes inwards and outwards. In this case, separate coupling parts 20*a* each having a bending part 22*a* are provided, unlike the body part 10 having the constant inner and outer diameter in which the coupling parts 20 are formed by being bent at both ends of the planar material constituting the body part 10. The coupling parts 20 are integrated with the body part 10*a* by a coupling method, such as welding. The bending part 22*a* of each of the coupling parts 20*a* has a width (approximately 100 mm or more) greater than that of conventional arts. The bending part 22*a* is curved into the same curvature as that of the body part 10*a* to ensure stability while being attached to the body part 10*a*. In addition, stepped parts 23*a* and 44*a* are respectively provided on each coupling part 20*a* and the reinforcing unit 40*a* in the same manner as that described for the stepped part 12*a* of the body part 10*a*.

Due to the stepped parts 12*a*, 23*a* and 44*a*, the pipe joint of the present invention can simply join pipes 1 having different diameters. Even when a pipe 1 is inserted into another pipe 1, the water tightness of the pipes 1 is reliably maintained.

Figure 4:
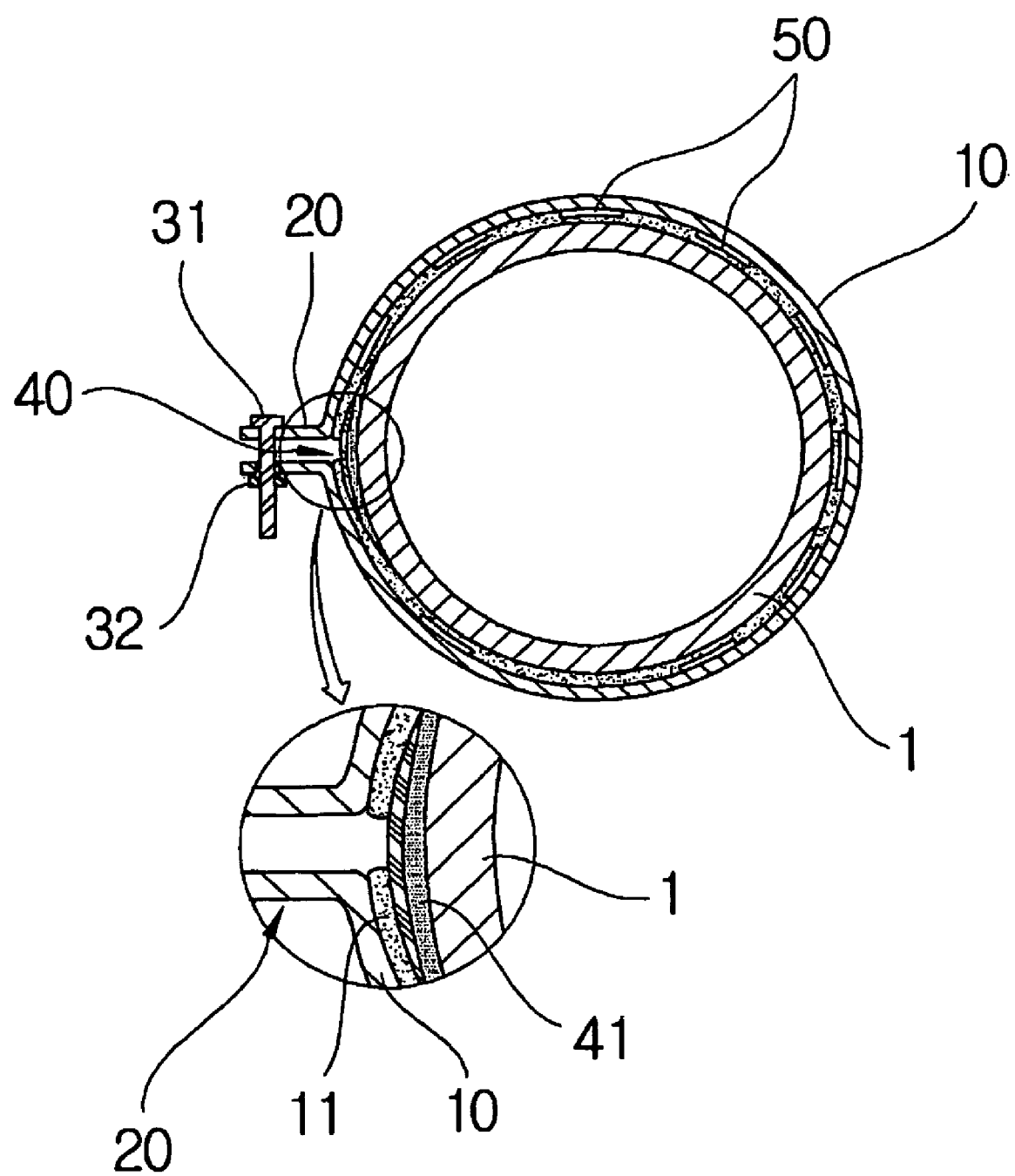
FIG. 4 is a sectional view of the operation of the pipe joint of the first embodiment of the present invention.

In the above-mentioned embodiments of the present invention, the sealing units 11, 11*a*, 41, 41*a*, which are made of a rubber or a synthetic resin, such as polyethylene (PE), are provided inside the body part 10, 10*a* and the reinforcing unit 40, 40*a* to provide the sealing effect. Furthermore, as shown in FIGS. 4 and 6, a plurality of close contact means 50, 50*a* each having a groove shape is formed on a surface of the sealing unit 11, 11*a*, which is in close contact with the inner surface of the body part 10, 10*a*, to be spaced apart from each other at regular intervals. The close contact means 50, 50*a* increases a contact force at a contact surface between the reinforcing unit 40, 40*a* and the body part 10, 10*a* and serves as a cushion material between the outer surfaces of the pipes 1 and the inner surface of the body part 10, 10*a*. In the meantime, in the embodiment in which the body part 10 has constant inner and outer diameter, upper and lower parts of the sealing material 11 may differ in thickness. Then, this pipe joint can execute the same role as that of the embodiment in which the upper and lower parts of the body part 10*a* differ in inner and outer diameters from each other.

As shown in FIGS. 3 through 8, the reinforcing unit 40, 40*a* of the present invention is gradually reduced in thickness from the center to both ends thereof. Furthermore, the reinforcing unit 40, 40*a* is made of a metal or a synthetic resin having a predetermined hardness to be curved into the same curvature as that of the body part 10*a*. The reinforcing unit 40, 40*a* having the above-mentioned structure is in close contact with the inner surface of the body part 10, 10*a* to reinforce the sealing effect at the coupling parts 20, 20*a*. Additionally, the reinforcing unit 40, 40*a* further includes a stop means 42, 42*a* having a stepped shape. When the reinforcing unit 40, 40*a* is mounted to the body part 10, 10*a*, a lower end of the body part 10, 10*a* is stopped by the stop means 42, 42*a*. As such, the stop means 42, 42*a* serves to help longitudinally position the reinforcing unit 40, 40*a*. Preferably, a positioning means 43, 43*a* having a stepped shape and a role as a basic line is longitudinally provided on an outer surface of the reinforcing unit 40, 40*a*. Thus, the positioning means 43, 43*a* serves to help horizontally position the reinforcing unit 40, 40*a* which is mounted to the body part 10, 10*a*.

The body part 10, 10*a* of the pipe joint of the present invention is firmly mounted around a junction between the pipes 1 by the locking means 30, 30*a*, such as a locking bolt 31, 31*a* and a locking nut 32, 32*a*, which is tightened into each of the locking holes 21, 21*a* of the coupling parts 20, 20*a*. Preferably, the locking holes 21, 21*a* of at least one side of the opposite coupling parts 20, 20*a* are defined into angled shapes, such as rectangular or hexagonal shapes. The locking nuts 32, 32*a* of the locking means 30, 30*a* are also angled to correspond to the angled locking holes 21, 21*a*, thus easily tightening of the locking means 30, 30*a* into the locking holes 21, 21*a*.

The operation of the pipe joint of the present invention will be described herein below.

The pipe joint of the present invention can easily solve problems, such as water leakage, occurring due to a difference in diameter between two pipes 1 when the two pipes 1 are coupled to each other such that one is inserted into the other. First, the body part 10, 10*a* is placed around the junction of the pipes 1. The body part 10, 10*a*, the reinforcing unit 40, 40*a*, or the sealing units 11, 41, 11*a* and 41*a*, which are respectively provided inside the body part 10, 10*a* and the reinforcing unit 40, 40*a*, surround the outer surface of the junction of the pipes 1 to be in close contact with each other.

In a detailed description, the reinforcing unit 40, 40*a* is positioned at a predetermined position around the coupling parts 20, 20*a* of the body part 10, 10*a*, which surrounds the junction of the pipes 1, by using the stop means 40, 40*a* and the positioning means 42, 42*a*. In the above state, the locking means 30, 30*a* is tightened into each of the locking holes 21, 21*a* of the coupling parts 20, 20*a*. Then, the body part 10, 10*a* come into close contact with the outer surface of the pipes 1 while a gap between the coupling parts 10, 10*a* becomes narrowed. At this time, the sealing unit 11, 41, 11*a* and 41*a*, which are provided inside the body part 10, 10*a* and the reinforcing unit 40, 40*a*, are compressed between the outer surface of the pipes 1 and the inner surfaces of the body part 10, 10*a* and the reinforcing unit 40, 40*a*, respectively. As well, the desired contact force is maintained at the body part 10, 10*a* and the reinforcing unit 40, 40*a* by the close contact means 50, 50*a* provided in each of the sealing means 11, 41, 11*a* and 41*a*.

Here, in the embodiment in which the upper and lower parts of the body part 10*a* differ in inner and outer diameters, the bending part 22*a* of each of the coupling parts 20*a* has a sufficiently wide contact area. Therefore, even if the locking means 40, 40*a* are strongly tightened, the coupling of the coupling part 20*a* to the body part 10*a* is stably maintained, thus ensuring the durability of the pipe joint.

Furthermore, due to the special structure in which the reinforcing unit 40, 40*a* and the body part 10, 10*a* overlap each other around the coupling part 20, 20*a*, the pipe joint of the present invention can be adapted to pipes 1 having diameters larger than the body part 10, 10*a* and, as well, it can prevent water leakage from occurring at a junction between the pipes.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, the present invention provides a pipe joint which joins pipes, such as branch pipes and drain pipes in a manhole, and by which pipes having various diameters as well as pipes having different diameters can be easily joined, thus reducing the time required for joining pipes. Particular, even when the pipes are joined into a stepped shape, a gap between the pipe joint and the pipes is firmly sealed, thus preventing water from leaking.

In addition, in the pipe joint of the present invention, a body part and coupling parts comprise an integrated plate or the coupling parts are integrally coupled to the body part. Therefore, the durability of the product is improved and, as well, the productivity of the pipe joint is increased by an improvement in a manufacturing process. As such, the pipe joint of the present invention greatly affects both producers and consumers due to its economic efficiency.

The invention claimed is:

1. A pipe joint, comprising:
   a body part provided by rolling a planar material to form a cylindrical structure, the body part having a pair of opposing circumferential edges and a pair of opposing axial edges, the axial edges of the body part defining a longitudinal slot, the body part defining a central longitudinal axis extending between the pair of opposing circumferential edges, the body part further defining an axis transverse to the central longitudinal axis that extends between the pair of opposing axial edges of the body part;
   a coupling part having a bent surface at opposing axial edges of the body part, with a plurality of locking holes provided in the bent surface of the coupling part;
   locking means tightened into the locking holes to couple the opposing axial edges of the body part to each other;
   a reinforcing unit comprising a separate curved plate, the reinforcing unit having a pair of opposing circumferential edges and a pair of opposing axial edges, the reinforcing unit defining a longitudinal axis extending between the pair of opposing circumferential edges, the reinforcing unit further defining an axis transverse to the longitudinal axis that extends between the pair of opposing axial edges of the reinforcing unit, the reinforcing unit being gradually reduced in thickness along a circumferential direction extending from the center of the reinforcing unit to both axial edges of the reinforcing unit to be in close contact with an inner surface of the body part; and
   a positioning means comprising a linear ridge defined by the reinforcing unit that extends between the circumferential edges of the body part in a longitudinal direction along at least a portion of an outer surface of the reinforcing unit, the linear ridge having a stepped shape that horizontally positions the reinforcing unit against the body part relative to the central longitudinal axis of body part, the stepped shape of the linear ridge extending outwardly from the interior of the body part and into at least a portion of the longitudinal slot of the body part to correspondingly engage the longitudinal slot;
   the reinforcing unit further comprising a stop means having a stepped shape, the stop means extending along at least a portion of one edge of a pair of opposing circumferential edges of the reinforcing unit; and
   wherein at least one edge of the pair of opposing circumferential edges of the body part and at least one edge of the pair of opposing circumferential edges of the reinforcing unit are coplanar with respect to one another.

2. The pipe joint according to claim 1, wherein the body part is stepped around a predetermined portion thereof so that upper and lower parts of the body part, relative to the central longitudinal axis thereof, differ in inner and outer diameters from each other, the upper part defined by an area between one of the circumferential edges of the body part and the stepped portion, and the lower part defined by an area between the other circumferential edge of the body part and the stepped portion, each of the upper and lower parts having a constant inner and outer diameter and defining substantially concentric, graduated parts such that the constant inner and outer diameter of one part is greater than the constant inner and outer diameter of the other part.

3. The pipe joint according to any one of claims 1 through 2, further comprising:
   a sealing unit provided for each of the body part and the reinforcing unit, the sealing units positioned against the radial interior surfaces of each of the body part and the reinforcing unit to provide a sealing effect after joining pipes.

4. The pipe joint according to claim 3, wherein the sealing unit comprises:
   a close contact means to increase a contact force at a contact surface thereof, the close contact means spaced apart and extending longitudinally along at least a portion of the surface of the sealing unit in contact with the inner surface of the body part.

5. The pipe joint according to any one of claims 1 through 2, wherein each of the coupling parts comprises a bending part to be attached to the body part.

* * * * *